United States Patent [19]

Lüssi

[11] Patent Number: 5,408,917

[45] Date of Patent: Apr. 25, 1995

[54] APPLIANCE FOR PREPARATION OF HOT DRINKS

[76] Inventor: André Lüssi, Selhofenstrasse 14, 3084 Wabern, Switzerland

[21] Appl. No.: 196,122

[22] PCT Filed: Jul. 1, 1993

[86] PCT No.: PCT/CH93/00167

§ 371 Date: Feb. 16, 1994

§ 102(e) Date: Feb. 16, 1994

[87] PCT Pub. No.: WO94/01028

PCT Pub. Date: Jan. 20, 1994

[51] Int. Cl.[6] .......................................... A47J 31/00
[52] U.S. Cl. ...................................... 99/281; 99/294; 99/323.1; 219/428; 392/324
[58] Field of Search ................. 99/279, 280, 281, 282, 99/283, 293, 294, 299, 300, 316, 291, 323.1; 219/42; 392/323, 324, 441

[56] References Cited

U.S. PATENT DOCUMENTS

| | | | |
|---|---|---|---|
| 4,287,817 | 9/1981 | Moskowitz | 392/441 |
| 4,405,855 | 9/1983 | Kolle | 392/441 |
| 4,565,121 | 1/1986 | Ohya | 99/293 |
| 4,644,571 | 2/1987 | Narita | 99/280 |
| 4,757,753 | 7/1988 | Pandolfi | 99/293 |
| 4,857,758 | 8/1989 | Rigazio | 99/280 |

Primary Examiner—Robert W. Jenkins

[57] ABSTRACT

The appliance, in particular a coffee machine, comprises three boilers (1, 2, 3). In addition a heating element (10, 11, 12) is disposed in each boiler, which element can be switched on and off through one switching means each (20, 21, 22) which are provided in a control mechanism (16). In each of the boilers moreover there is one temperature sensor (13, 14, 15) to measure the temperature of the hot water. The control mechanism (16) has in addition computational means (17) as well as memory means (18, 19). Among other things predetermined desired temperatures for the water in the individual boilers as well as the maximum available power supply of the coffee machine can be stored in the memory means (18, 19). The control mechanism is designed in such a way that, based on the water heating pattern in the individual boilers, the heating capacity can be apportioned to the boiler which needs it most according to a certain order of priority. At the same time the is a control so that the heating capacity accepted by the coffee machine does not exceed the available power supply. Through this variable distribution of heating capacity to the individual boilers, a large number of drinks can be supplied when the maximum available power does not suffice to supply all the heating elements with energy at the same time. The distribution of heating capacity takes place in the appliance according to the invention depending upon the energy supply and depending upon the required power of the individual boiler.

16 Claims, 5 Drawing Sheets

APPLIANCE FOR PREPARATION OF HOT DRINKS

BACKGROUND OF THE INVENTION

The present invention relates to a device for the preparation of hot drinks including at least two hot water boilers each having an electrical heating element, a temperature sensor, a cold water inlet, and an outlet. The device also includes a control mechanism with means for controlling electrical energy supplied to the heating elements depending on water temperatures measured in the boilers.

The invention relates in particular to a coffee machine which permits, in addition to the preparation of coffee, the preparation or heating up of other drinks, such as tea or milk, by providing hot water or steam.

There are coffee machines on the market in which two hot water boilers are built in. Each of the two contains a heating element to heat up the water stored therein and a temperature sensor to measure the water temperature. Each of the temperature sensors sends a signal to a control mechanism in which the heating element of the corresponding boiler switches on when the temperature drops below a set point, and switches off when the desired temperature is reached again.

While the first boiler is filled with hot water which is needed to prepare coffee, the second boiler is often only partially filled with hot water. In this case the filling amount is controlled by a level controlling device, and in the remaining volume of the second boiler there is steam. Cold water can be supplied to each of the boilers via a cold water inlet. The hot water of the first boiler can be drawn off via a hot water outlet, and can be conveyed to a brewing device to prepare coffee. The second boiler includes a steam outlet in the embodiment described above, which is disposed on the top of the boiler and which is provided additionally with a hot water outlet, foreseen below the hot water level. Coffee machine models are also available in which the second boiler is filled with hot water, and has only a hot water outlet, or where only steam, but no hot water, can be drawn off, as in the design presented above.

With these prior art coffee machines, each heating element, controlled via a corresponding switching means, is joined in parallel to the mains voltage. One assumes that at least as much power can be provided from the supply mains as the two heating elements together are able to turn into heat.

This is usually the case with three-phase supply mains. Normally each of the two heating elements is fed with a separate phase.

In the case of single-phase power mains and with existent power outlets, the problem arises that the available power, which is determined by the mains voltage and corresponding to the fuse value, lies below the maximum power necessary to supply the coffee machine when the two heating elements are switched on simultaneously. To avoid blowing a fuse, expensive rewiring has to be done in these cases even though the maximum power of the coffee machine is only rarely consumed. Namely only when, after switching on, the water in the boilers is being heated up, or only when warm water or steam is supplied just after coffee has been supplied, or vice-versa.

SUMMARY OF THE INVENTION

It is the object of the present invention to improve a coffee machine of the type described to such an extent that the machine can be connected to power outlets with a smaller amount of suppliable power than would be necessary to switch on all the heating elements simultaneously without the fuse connected in series being overloaded, and so that the number of possible drinks supplied per period of time is hardly limited.

This object is fulfilled according to the invention with a device for the preparation of hot drinks which is equipped with a control mechanism which has computational means and memory means. Stored in the memory means are maximum power available to the device stored as a power value and desired temperatures for hot water in at least two boilers. The control mechanism calls up temperatures measured in the boilers by temperature sensors and the computational means determines deviations from the desired temperatures, as well temperature gradients. Means for controlling heating elements, depending upon the power value, the temperature deviation in each boiler, or the temperature gradient in each boiler, apportions and distributes available power, at most the memory-stored maximum power, as heat capacity depending on need to one of the heating elements, or several of the heating elements either concurrently or consecutively.

To begin operation of the machine, the maximum power which can be delivered by the supply main is ascertained, and is stored in the memory of the machine with a data input device connected or connectible to the control mechanism of the machine. Depending upon which of the water-heating devices, especially depending upon from which of the boilers a supply has just been made, at most the entire available energy will be put at the disposal of this device, but only as long as is necessary for the water stored therein to reach the desired temperature again. If the available power is greater than the heating power which can be absorbed by one of the heating elements, then the power unused by one of the heating elements can be given to another of the heating elements. There is a constant control so that the maximum power is not exceeded.

Such an optimized distribution of the available power to the individual devices to heat water makes it possible to supply drinks with the highest possible degree of efficiency. Understood as efficiency is the number of drinks supplied in a period of time with a predetermined available power, the supply of drinks not being uniformly distributed among the individual sources (coffee, hot water, steam).

In a water-heating device in which steam is provided, the desired temperature of the water amounts to about 130° C. A disadvantage of this high temperature is that there are lime desposits from the water which settle on the heating element and on the interior walls of the device. Corresponding heat losses and necessary maintenance tasks are the consequences. Radiation losses from the device, which are not insignificant, arise due to the high water temperature. This happens above all when the dimensions of the device are correspondingly great, which can be the case, for example, if the device is designed to draw off hot water and steam. When, as set forth in patent claim 4, the device is equipped with three water-heating devices, of which the second is designed solely to supply steam, the formation of lime deposits therein can be kept at a minimum because experience has shown that the steam consumption and consequently the refilling of cold water are relatively minimal.

Since the entire hot water storage volume needed is divided among three water-heating devices, each of the latter can have a hot water tank of a correspondingly small volume. Because, as set forth in patent claim 5, the water temperature is kept above 100° C. only in the device designed to provide steam, the total radiation losses are kept advantageously small.

The number of supplies for drinks which can be drawn off with a given power and a non-linear supply distribution among the individual sources is all the greater when the distribution of the available heat capacity to the individual heating elements of the water-heating devices, as set forth in patent claims 6 and 7, does not take place according to absolute deviations of the actual water temperature from the desired temperature values, but rather if this distribution is dependent as well upon temperature gradients, in particular temperature drops, and follows an order of priority.

Since the order of priority can be adjusted to the number of drinks supplied from the individual water-heating devices, as set forth in patent claim 8, a self-teaching design of the device results.

If the device is designed with the features according to patent claim 9, then the situation can be avoided where the heating elements are overloaded and/or the available energy capacity exceeded in the case of overvoltage. A significantly larger reliable voltage range between minimal low voltage and maximum overvoltage can thus be achieved.

From the features cited in the dependent patent claims not especially dealt with here, further advantageous embodiments of the device according to the invention result.

BRIEF DESCRIPTION OF THE DRAWINGS

The present invention will now be explained in more detail in the following, by way of example, with reference to the figures, in which.

DETAILED DESCRIPTION OF PREFERRED EMBODIMENTS

Figure 1:
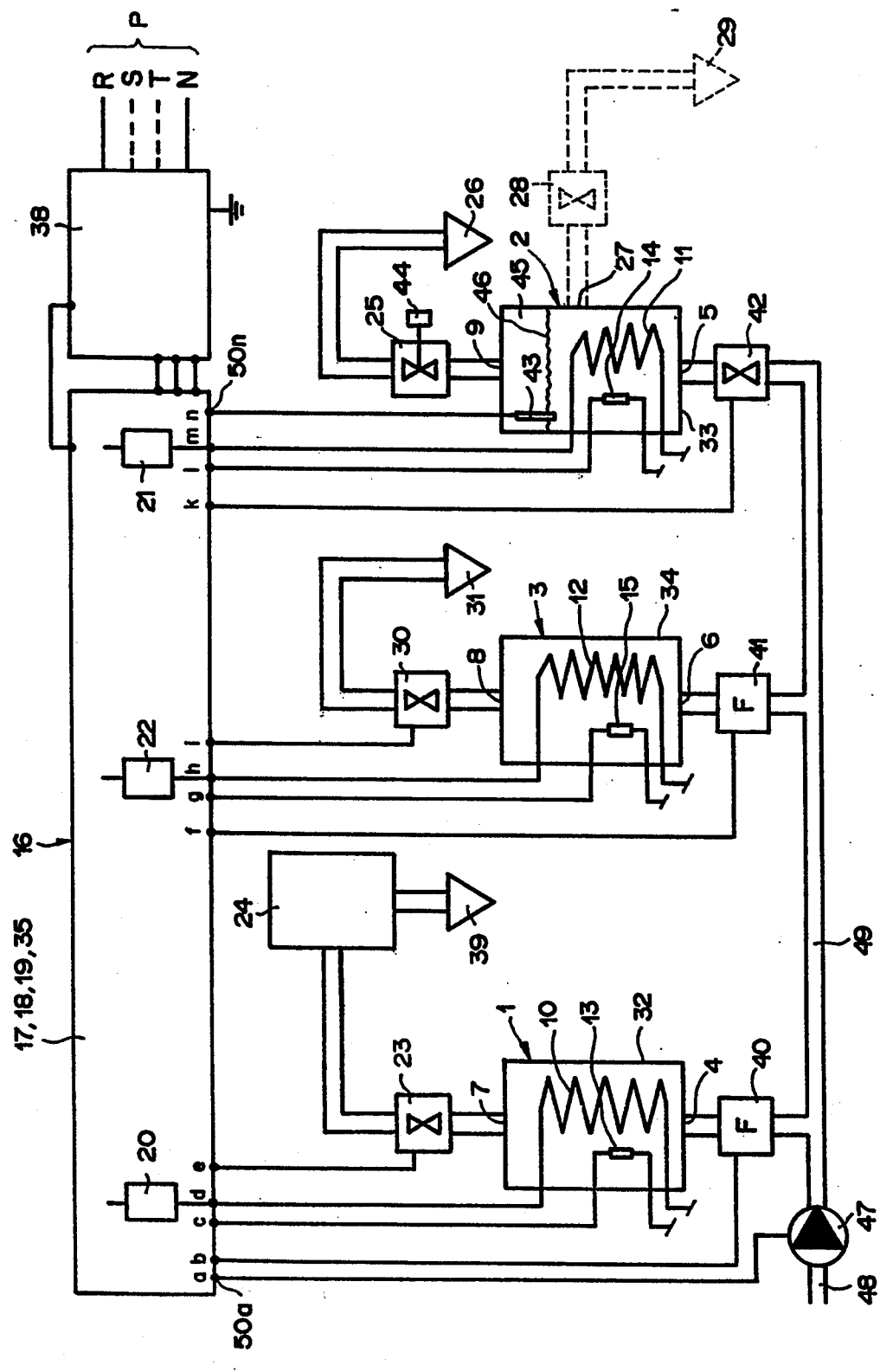
FIG. 1 shows the construction of the device according to the invention with three water-heating devices, in diagrammatic section.

Presented only schematically in FIG. 1 is an embodiment of the device according to the invention for the preparation of hot drinks, namely a coffee machine. The device comprises three water-heating devices 1, 2, 3. Each of the water-heating devices consists of one hot water tank 32, 33, 34 each, in which is disposed one water heating element 10, 11, 12 each and one temperature sensor 13, 14, 15 each. Used as heating elements are preferably electrical resistance heating elements, and NTC resistors can be employed as temperature sensors, for example.

Disposed on each hot water tank 32, 33, 34 is one cold water inlet each 4, 5, 6, through which the corresponding hot water tank can be filled or refilled, respectively. Cold water inlet 4 of first water-heating device 1 is connected to a cold water delivery line 49 via a first flow meter 40. Via a controllable inlet valve 42, cold water inlet 5 of second water-heating device 2 is connected to the cold water delivery line. The last-mentioned also feeds cold water inlet 6 of the third water-heating device via a second flow meter 41. Cold water delivery line 49 is fed from a cold water connection 48 via a pump 47. Cold water connection 48 can lead into a water reservoir. It is also possible to hook up the cold water connection directly to the water supply network. Depending upon the circumstances, pump 47 would not be necessary in this case.

Disposed on first hot water tank 32 is a first hot water connection 7, which is connected with a brewing device 24 of a coffee machine via a controllable first outlet valve 23. The coffee prepared in the brewing device can be drawn off via a coffee dispensing nozzle 39 of brewing device 24.

Second water-heating device 2 serves to provide steam. Its hot water tank 33 is therefore only partially filled with water. A filling level sensor 43 built into second hot water tank 33 serves to determine the existing water level 46. The steam is located in the space not filled with water in second hot water tank 33. This steam can be drawn off via a second steam outlet 9, which extends to a steam jet 26 via a second outlet valve 25. Second outlet valve 25 is controllable manually, for example by means of a removal element 44, which can be a hand valve.

Disposed on third hot water container 34 of third water-heating device 3 is a second hot water outlet 8, which is connected to a nozzle 31 via a third outlet valve 30 to deliver hot water.

There is an electrical control mechanism, designated 16. This comprises a computational means 17, a first memory means 18, a second memory means 19 and a supply voltage measurement means 35, with which the supply voltage R, S, T, N, conveyed to a power supply part 38, can be measured. Designated 20, 21 and 22 are first, second and third switching means which serve to switch on and off the electrical energy conveyable to the first, second and third heating elements 10, 11, 12. Relays, thrystors or triacs could be used for this purpose, for example.

Control mechanism 16 is connected to the previously described mechanical, electromechanical or electronic components via electrical connections 50a to 50n. Connection 50a serves to convey electrical energy to water pump 47. The lines 50d, 50n and 50h are intended to convey heating energy to heating elements 10, 11, 12. Through connections 50c, 501 and 50g, control mechanism 16 receives signals from temperature sensors 13, 14, 15, corresponding to the water temperature in hot water tanks 32, 33, 34. Flow meters 40, 41 pass on electrical signals to control mechanism 16, in proportion to the quantity of flow, through connection 50b and 50f. The electrically controllable valves 23, 30, 42 are connected to control mechanism 16 via connections 50e, 50i and 50k. The filling level sensor 43 gives an electrical signal via connection 50n to control mechanism 16, corresponding to a sensed filling level. Processed in power supply part 38 is the d.c. and a.c. voltage necessary for operation of the individual components as well as for the electronic control mechanism 16.

Hot water tanks 32, 34 of first and third water-heating devices 1, 3 for heating water are filled completely with water. This water is heated up to a desired temperature by heating elements 10, 12, the desired temperature having been stored in second memory means 19 of control mechanism 16 and maintained. The water temperature in hot water tanks 32 and 34 is measured constantly by temperature sensors 13, 15. The course of the water temperature over time is also stored in digital form (sampling) in second memory means 19. Depending upon this course as well as upon deviations from the desired temperatures, switching means 20, 22 to convey the heating energy to heating elements 10 and 12 are controlled. The desired temperature of the water in hot water tanks 32, 34 is set preferably at about 90° C.

In drawing off water from one of the said hot water tanks 32, 34, the associated valve 23, 30 is controlled by the control mechanism and opened. While hot water is removed, cold water flows in through the corresponding cold water inlet 4, 6 of device 1, 3, with corresponding cooling of the hot water stored therein. The quantity of water removed corresponds to the quantity of water fed in. Flow meters 40, 41 are intended to close the opened valve 23 or 30 after a certain amount of water has been removed, the volume of which corresponds to a cup or glass to be filled.

In second device 2, intended to provide steam, when steam is drawn off, the third hot water tank 33 is replenished with water only when the water level 46 has dropped below the level of filling level sensor 43. This state is reported by the last-mentioned to the control mechanism, which, for its part, controls inlet valve 42, through which water is refilled into the third hot water tank while the hot water remaining therein is cooled until filling level sensor 43 reports the desired level to the control mechanism.

The course of the temperature over time of the water stored in second device 2 is also kept in digital form in second memory means 19. The desired temperature of the hot water in the second device 2 is set preferably at about 130° C.

There are three sources of removal in the embodiment shown. These are the coffee dispensing nozzle 39, the nozzle 31 to provide hot water especially for brewing tea, and the steam jet 26 to remove steam, especially for heating up cold drinks such as milk, but also to warm up cups and glasses.

In a further embodiment of the device according to the invention, only first and second devices 1, 2 could be built in. The second device would then be provided with a hot water outlet 27, which would be disposed on second hot water tank 33 below the water level 46 and would be connected via a valve 28 to a nozzle to dispense hot water 29. Such an arrangement is shown in dots and dashed in FIG. 1. In this case a water level indicator to determine the level of hot water removed could be disposed on the hot water side connected in series with valve 28. The second hot water tank 33 would have to be dimensioned correspondingly larger in that case. The disadvantages mentioned above would result thereby.

The present invention can be used sensibly on coffee machines with at least two devices for heating water. Thus it would be possible to foresee only the first and the third of the said devices in a third embodiment.

Figure 2:
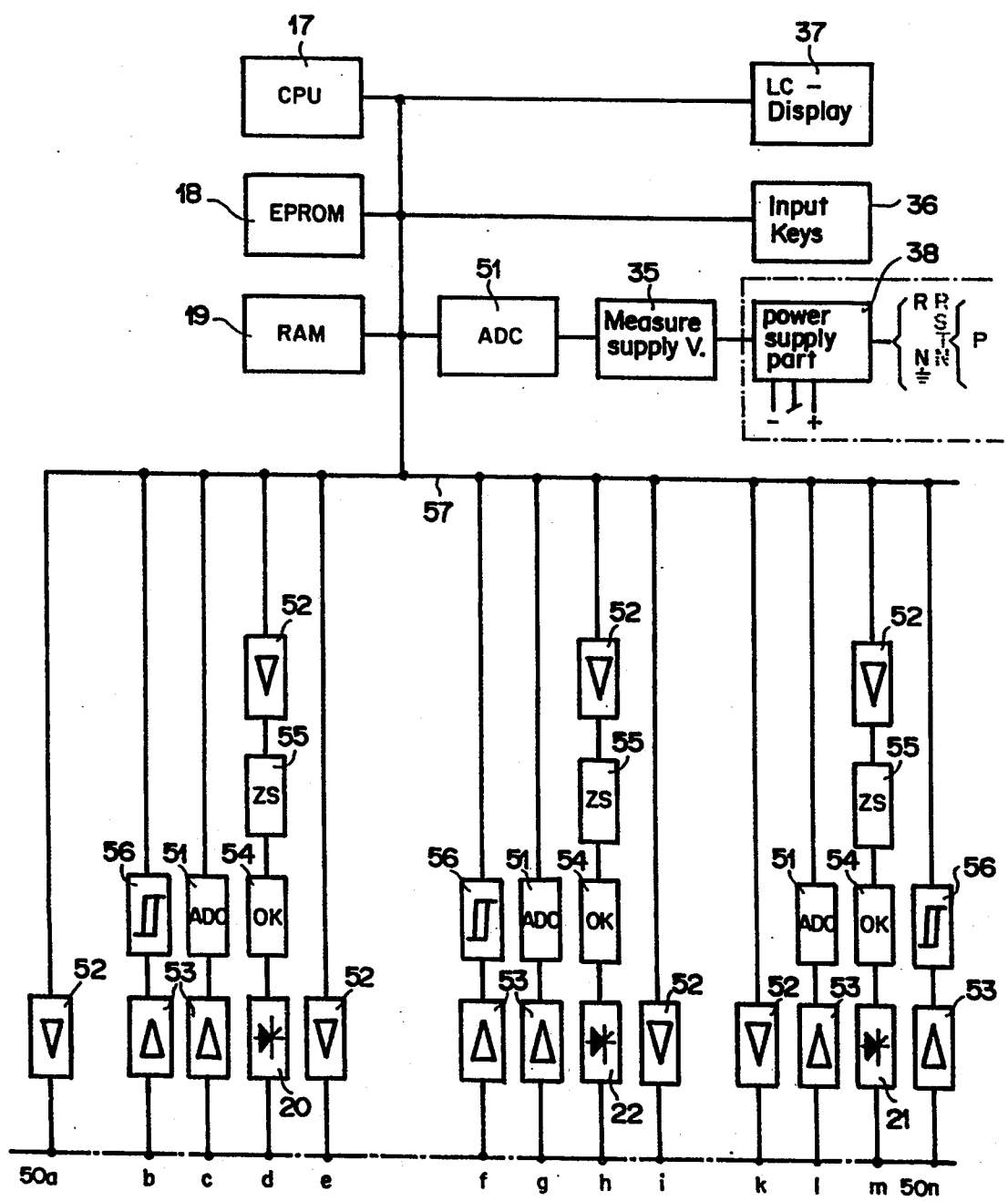
FIG. 2 is a block diagram of the control mechanism of the device according to the invention.

Presented in block diagram in FIG. 2 is the control mechanism 16 and the power supply part 38. Power supply part 38 is designed in such a way that either single-phase voltage R, N or three-phase voltage R, S, T, N can be connected to it. Each main circuit connection is capable thereby of providing a maximum current corresponding to the value of an existing fuse.

Power supply part 38 serves to process the a.c. and/or d.c. voltage necessary for operation of the device according to the invention.

In control mechanism 16 there are a computational means 17, a first memory means 18 and a second memory means 19, as already mentioned. Computational means 17 is a microprocessor of a design known per se. First memory means 18 is an EPROM in which the programme is stored to operate the device, and second memory means 19 is a RAM, in which are stored initialization data such as the desired temperatures of the water of the individual hot water tanks, the value of the available electrical power, predetermined removable quantities of water to fill cups and/or glasses, etc., as well as operational data, i.e. data measured and periodically digitized during operation of the device, such as the course of the hot water temperatures over time and the mains voltages measured by the mains voltage measuring means 35.

The second memory means 19, or a part thereof, can be battery-supported so that the initialization data in particular do not get lost when the device is turned off or when there is an interruption of current.

Analog data, such at the water temperatures in the hot water tanks and the mains voltages, are stored periodically in digitized form, as already mentioned. Therefore an analog/digital converter 51 must be foreseen for each analog datum.

Each of the electrical signals given by control mechanism 16 to one of the connections 50a, 50e, 50i and 50k is connected through an output buffer stage 52 each or an output amplifier. Similarly each of the signals conveyed to control mechanism 16 via connections 50b, 50c, 50f, 50g, 50l and 50n is switched through an input buffer stage 53 each or an input amplifier.

Each of connections 50b, 50f and 50n arriving from flow meters 40, 41 as well as from filling level sensor 43 has a cut-off trigger or a threshold switch 56.

Provided to control switching means 20, 21, 22, which are preferably thyristors or triacs, is one optical coupler each. Each of these is connected to one zero passage switch 55 each. To prevent generation of noise voltage, the latter serve to switch the electronic switching means 20, 21, 22 in a zero passage of the alternating voltage or the alternating current. The zero passage switches 55 receives the corresponding switch signals from computational means 17 via output buffer stage 52.

The individual components of control mechanism 16 are connected in a known way by means of one or a plurality of BUS configurations 57.

In the circuit described in FIG. 2, for switching means 20, 21 and 22, there is one control each which functions as follows: For power regulation, a certain number of periods from the full wave train of the a.c. supply voltage is sent to the individual heating elements. If only half of the heating capacity which a heating element can absorb is sent to the latter, this can be realized with the presented control mechanism in such a way that, for example, in cyclical order the corresponding switching means is switched on during five periods of a.c. voltage supply and switched off during the next five periods. This technique of control can be taken from the relevant technical literature. It would be equally conceivable to use a phase control instead. Suitable noise suppression means would have to be foreseen in addition.

Supply voltage measurement means 35 serve to measure constantly the voltage supply and to influence the control of the type described above for the switching means so that variations in voltage supply have no influence on the heating capacity. The heating elements and the control of the type described above are designed in such a way that with set minimum voltage and with 100% switched-on supply voltage, the full heating capacity can be absorbed by the heating element. The greater the supply voltage becomes up to a maximal overvoltage, the more wave trains are emitted. Achieved this way is that the device still works flawlessly with the minimal supply voltage and no overloading of the heating elements and/or of the fuse connected in series to the device occurs in the event of maximal overvoltage.

By means of an input device 36, data entry keys in the embodiment shown, which are disposed on a console panel, the aforementioned initialization data can be entered after a code word is given and can be stored in the RAM memory 19. During normal operation the data entry keys can be used to decide upon the type of drink, such as coffee, espresso, tea, etc. An output unit 37, an LC display in the embodiment shown, can be foreseen to give out or display, respectively, signals indicating malfunction, operational functions, readiness or non-readiness, etc.

Figure 3A:
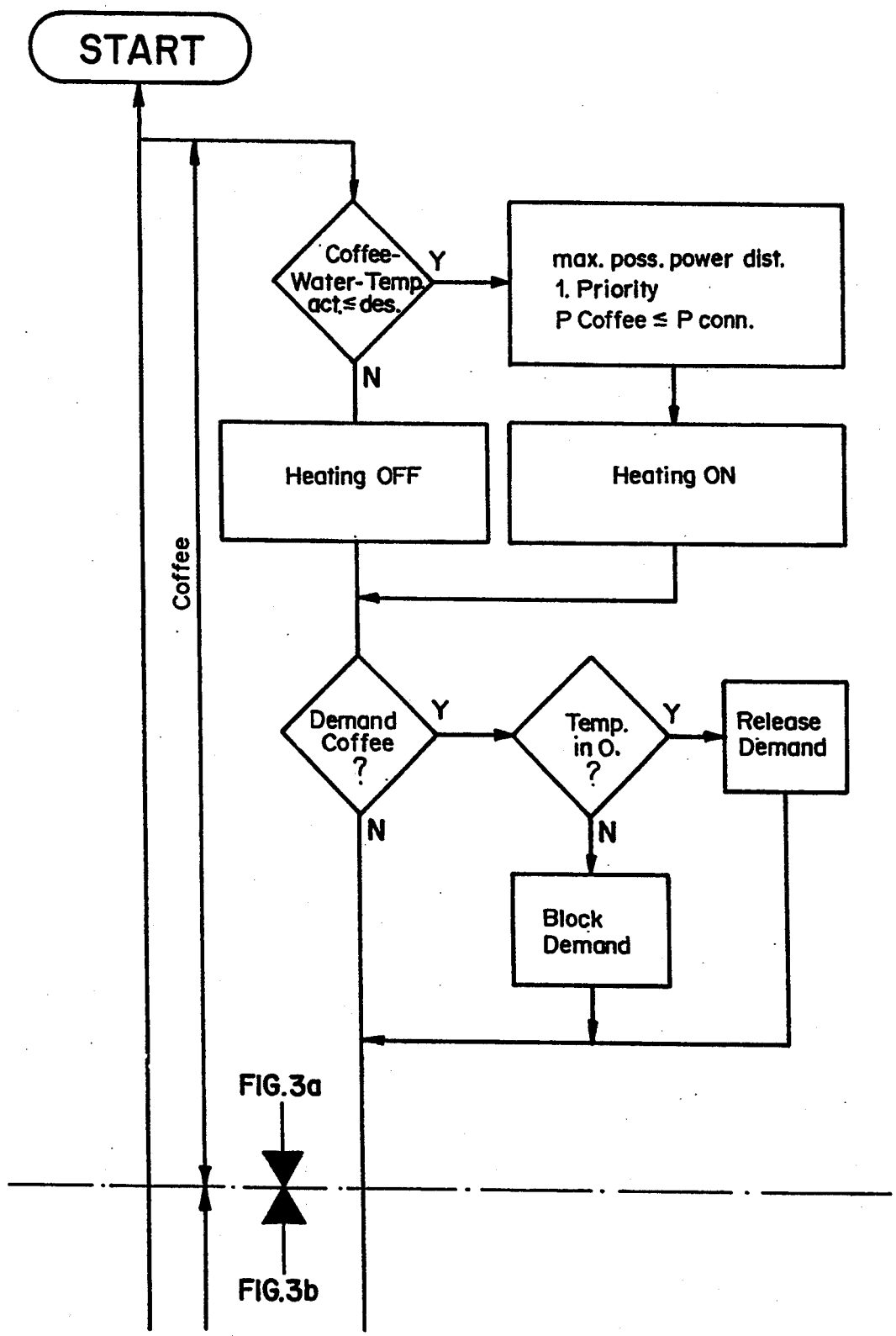
FIG. 3a–3c a flow chart to explain the working of the device.

The operation of the device according to the invention will be explained more closely in the following. This can be done making use of the flow chart, shown in FIG. 3a, 3b and 3c.

Figure 3B:
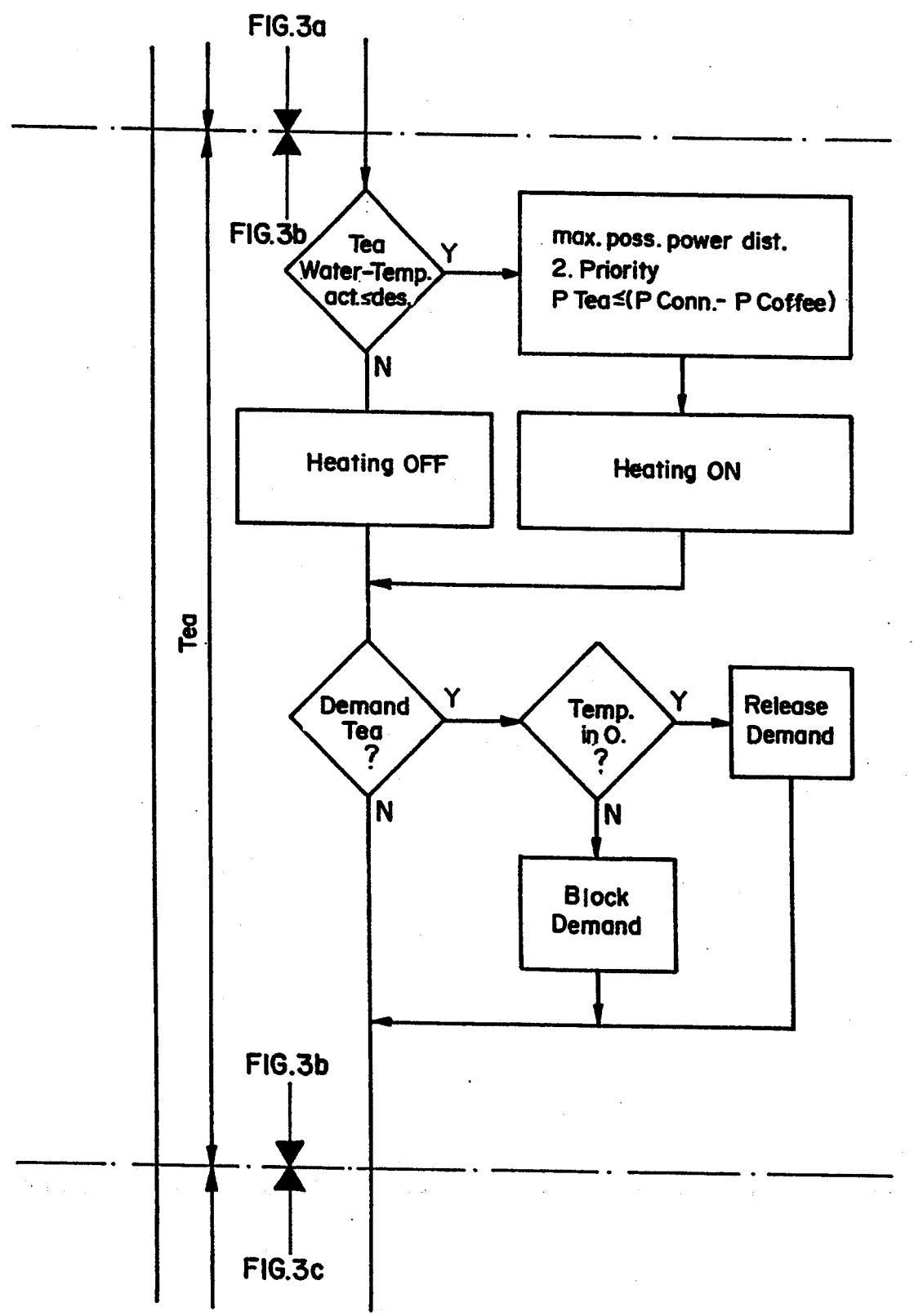
Figure 3C:
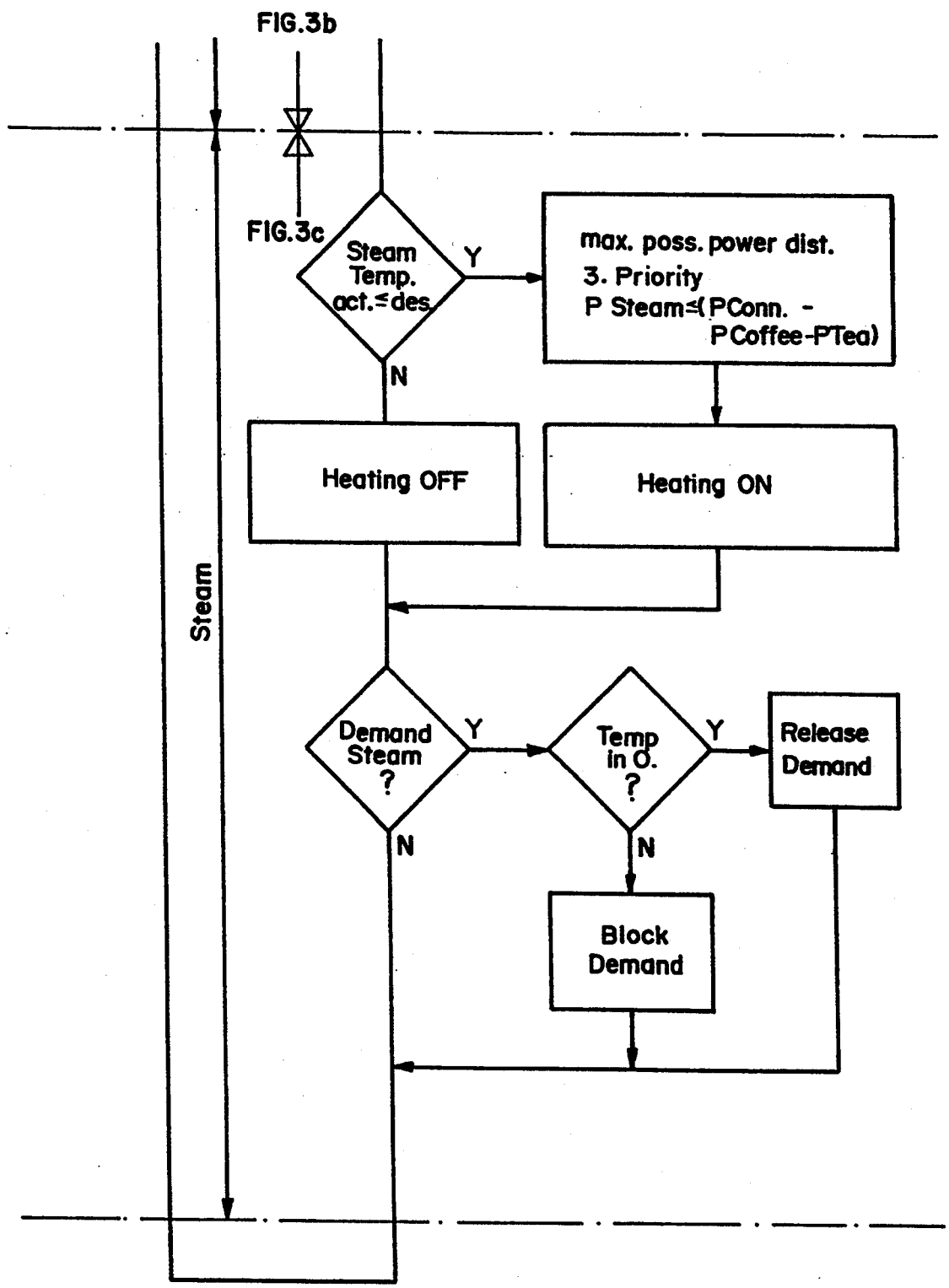

Let us assume that in switching on the coffee machine the hot water tanks already contain water, which has to be heated up. It can be seen from the flow chart in FIG. 3a that, because the question of whether the coffee water temperature is less than the set value can be answered affirmatively, the heating element of the first hot water tank receives the maximum possible distribution of power. Because the maximum available power is less than, or the same as, the power which can be absorbed by the heating element of the first hot water tank, the full available power will be connected to this heating element. In the case of too small an available power, this takes place in a way where the control means are passable cyclically only for a certain number of periods of the a.c. supply voltage. A supply of coffee is not yet possible because the desired temperature of the water in the first hot water tank has not yet been reached. If the available power supply is greater than the maximum which can be absorbed by the heating element of the first hot water tank, then the surplus capacity can put at the disposal of the heating element of the third water heating device (FIG. 3b). The same applies to the heating element of the device for providing steam according to FIG. 3c. This heating element can only be switched on, in the example shown, if some available power supply still remains after the heating element for the coffee water and the heating element for the other hot water have been switched on. This is practically only the case in a three-phase power main, where each heating element is connected to one phase. In a single phase main, in the case where the available power is less than or equal to the capacity which can be absorbed by one of the heating elements, always only one of the heating elements is switched on. Control of the control mechanism as described in the preceding ensures that the maximum possible power value is not exceeded. This is then the case, for example, when a heating element with a voltage of 220 V absorbs a capacity of 3 kW, but only has available a power outlet with 220 V voltage and a current value of 10 amperes. In a single phase network, if the available power exceeds the nominal power of an individual heating element, then, depending upon the available power, several of the heating elements can be switched on full and/or partially.

By means of the temperature sensors disposed in the hot water tanks, it is possible to detect when a supply of hot water or steam takes place. This is determined by sensing a corresponding cooling of the water stored in the hot water tanks. Based thereon it is possible to convey, in one of the ways previously described, the heating capacity to that heating element associated with the hot water tank from which a supply has been made.

Moreover, as can be seen from the flow chart 3a–c, to control the individual heating elements, the water temperatures measured by the temperature sensors are scanned cyclically by the computational means. Depending upon how much the actual temperature deviates from the desired value stored in the memory means, the heating capacity can be switched on to one and/or the other of the heating elements. In that the cyclically measured water temperatures are stored in digitized form in the second memory means, the course of the water temperature over time can be detected by the computational means. In particular the magnitude of a temperature drop in the case of a supply or the rise in temperature can be calculated. The available power can be switched to one or several of the heating elements only, on the one hand, in dependence on the absolute temperature difference between the actual temperature and the desired temperature of the water and, on the other hand, as a function of the maginitude of a temperature gradient, especially of a temperature drop.

The distribution of heating capacity to the individual heating elements is intended to follow an order of priority. Giving a fixed priority to the individual heating elements can be foreseen since experience has shown that coffee is supplied most, then hot water and finally steam, first priority being given to the heating element in the hot water tank for preparing coffee, second priority to the heating element in the hot water tank for preparing hot water, for example to brew tea, and third priority to the heating element in the hot water tank to produce steam.

The order of priority can also be designed to be variable. Thus it can be foreseen that as a first priority the heating element in the hot water tank in which the greatest drop in temperature has been detected receives heating capacity, and only as a second priority the heating elements of the hot water tanks where the actual temperature has only dropped below the desired value. This way heating capacity is given especially to the heating element in the hot water tank where a supply has just been made.

In a further embodiment it is conceivable to detect the number of supplies made from the various sources during a period of time, in that each supply, determined by the temperature sensor through a drop in temperature, is recorded in the second memory means, for example added up by a counter. After a certain period of time the computational means can determine which source made the most supplies. Based on this detected value, first priority can be given to the heating element of the hot water tank from which the most supplies were made and a correspondingly lower priority given to the heating elements of the other hot water tanks. The device is, so to speak, self-teaching. Depending upon the design and layout of the software program, one or the other of the variants just described, or a combination thereof, can be selected. This can be done, for example, through corresponding actuation of a data entry key following entry of a code word.

As already mentioned, an order for a drink can be made by actuating one of the data entry keys. As can be seen from the flow chart, blocking means of a software kind are foreseen in the control mechanism which permit a supply being made from one of the sources (coffee, hot water or steam) only when the hot water temperature has at least the desired value.

What is claimed is:

1. A device for preparation of hot drinks, said device comprising at least two hot water boilers each having an electrical heating element, a temperature sensor, a cold water inlet for admitting water into said boilers, and an outlet, and a control mechanism having means for controlling electrical energy supplied to the heating elements depending upon water temperatures measured in the boilers by the temperature sensors, computational means, and memory means, said memory means storing maximum power available to the device as a power value and desired temperatures for the water in the boilers, said control mechanism receiving the water temperatures measured in the boilers by the temperature sensors and said computational means determining temperature deviations from the desired temperatures as well as temperature gradients said control means, depending on the power value, the temperature deviations, and the temperature gradients, apportioning power at most corresponding to said power value as heating capacity to the heating elements depending upon need.

2. The device according to claim 1, wherein said outlet of a first boiler of said boilers is a hot water outlet connected via a first valve to a brewing device to produce coffee and said outlet of a second boiler of said boilers is a steam outlet connected to a jet via a second valve to release steam.

3. The device according to claim 2, wherein said outlet of a third boiler of said boilers is a hot water outlet connected via a third valve to a further jet to release water.

4. The device according to claim 3, wherein said boilers each have a hot water tank with said cold water inlet and said outlet each disposed on the tank, and each tank having only a hot water outlet being adapted to be heated up to at most 100° C. and each tank having a steam outlet being adapted to be heated to a higher temperature.

5. The device according to claim 1, wherein said outlet of a first boiler of said boilers is a hot water outlet connected via a first valve to a brewing device to produce coffee and said outlet of a second boiler of said boilers is a hot water outlet connected via a second valve to a jet to release water.

6. The device according to claim 1, wherein each of said boilers has means for detecting a supply of hot water or steam, and said control means is controllable depending upon the detection means.

7. The device according to claim 6, wherein said detection means are the temperature sensors.

8. The device according to claim 1, wherein said heating elements of the boilers are apportioned heating capacity in an order of priority, whereby as a first priority the heating element of the boiler in which the greatest temperature gradient is ascertained receives heating capacity, and only as a second priority the heating elements of the boilers in which only temperature deviations are detectable are given heating capacity.

9. The device according to claim 8, wherein said memory means is adapted to store a number of supplies from each of the boilers over a certain period of time and said order of priority is adapted to be adjusted based upon the number of supplies from each of the boilers.

10. The device according to claim 1, wherein said control mechanism has means for measuring a supply voltage and said control means is controllable depending upon the supply voltage.

11. The device according to claim 1, wherein said power can be taken from not only a three-phase power main, but also from a one-phase power main.

12. The device according to claim 1, wherein said control means comprises means for switching the heating elements on and off.

13. The device according to claim 12, wherein said switching means comprises at least one relay.

14. The device according to claim 12, wherein said switching means comprises at least one phase controlled thyrister.

15. The device according to claim 12, wherein said switching means comprises at least one phase controlled triac.

16. The device according to claim 1, further comprising means for requesting a drink and wherein said control mechanism has blocking means with which, following a request for a drink, is adapted to release another drink only when the water temperature in the corresponding boiler is about the same as the desired temperature.

* * * * *